(12) United States Patent
Mucke (10) Patent No.: US 7,653,364 B2
(45) Date of Patent: Jan. 26, 2010

(54) LOCAL OSCILLATOR LEAKAGE RELOCATION

(75) Inventor: Lars H. Mucke, Carlsbad, CA (US)

(73) Assignee: Staccato Communications, Inc., San Diego, CA (US)

( * ) Notice: Subject to any disclaimer, the term of this patent is extended or adjusted under 35 U.S.C. 154(b) by 416 days.

(21) Appl. No.: 11/591,672

(22) Filed: Nov. 1, 2006

(65) Prior Publication Data

US 2007/0111682 A1 May 17, 2007

Related U.S. Application Data

(60) Provisional application No. 60/734,524, filed on Nov. 7, 2005.

(51) Int. Cl.
*H04B 1/04* (2006.01)
*H04Q 7/20* (2006.01)

(52) U.S. Cl. .................................. 455/114.1; 375/296
(58) Field of Classification Search ... 455/114.1–114.2, 455/115.1; 375/296
See application file for complete search history.

(56) References Cited

U.S. PATENT DOCUMENTS

| 6,686,830 | B1 | 2/2004 | Schirtzer |
| 2005/0107051 | A1 | 5/2005 | Aparin et al. |
| 2005/0117670 | A1 | 6/2005 | Webster et al. |
| 2005/0238116 | A1* | 10/2005 | Monta .................. 375/298 |

\* cited by examiner

*Primary Examiner*—Lee Nguyen
(74) *Attorney, Agent, or Firm*—Van Pelt, Yi & James LLP (57) ABSTRACT

An indication is received to relocate leakage in a transmission signal to be transmitted. A frequency change associated with relocating the leakage in the transmission signal is obtained. The leakage in the transmission signal is relocated based at least in part on the frequency change.

24 Claims, 8 Drawing Sheets

LOCAL OSCILLATOR LEAKAGE RELOCATION

CROSS REFERENCE TO OTHER APPLICATIONS

This application claims priority to U.S. Provisional Patent Application No. 60/734,524 entitled LOCAL OSCILLATOR LEAKAGE RELOCATION FOR DETECTION AND AVOIDANCE filed Nov. 7, 2005 which is incorporated herein by reference for all purposes.

BACKGROUND OF THE INVENTION

Ultra wideband (UWB) is a type of wireless system that uses a significant amount of frequency spectrum. For example, bands described in the WiMedia UWB specification have bandwidths of 508 MHz. Sometimes a UWB system shares the wireless medium with other (e.g., narrowband) wireless systems by creating a notch in the UWB transmission signal where the other wireless system is operating. For example, some narrowband wireless systems have bandwidths on the order of 1 to 20 MHz and in some cases a notch (e.g., approximately 10 or 30 MHz wide) is created by a UWB system at the frequency spectrum where the other wireless system is operating.

One issue associated with creating a notch is leakage from a local oscillator operating at the UWB carrier frequency (e.g., center frequency of a band). Some regulatory agencies in Europe and/or Japan are discussing levels of suppression for UWB systems that are lower than previously required for other systems. Although there may exist some techniques for removing or suppressing local oscillator leakage (e.g., developed for narrowband systems), these techniques may not necessarily be able to remove or suppress local oscillator leakage to a degree sufficient for some proposed requirements. For example, the notch (which is often added in the digital domain) may not be able to reduce or remove local oscillator leakage since it is added afterwards. In the analog domain, using a filter to remove local oscillator leakage may be undesirable since such a filter would have to be operated at very high frequencies (e.g., in the range of 3.96 GHz if a 3.96 GHz carrier frequency is used) and would need to be quite narrow so that information in adjacent frequencies is not removed. It would be desirable to develop new techniques for dealing with local oscillator leakage.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
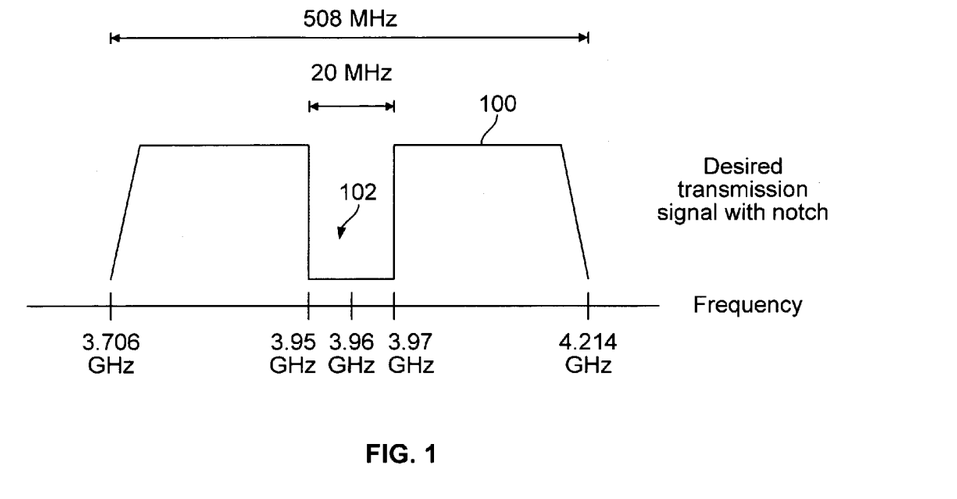
FIG. 1 is a diagram illustrating an embodiment of a desired transmission signal.

FIG. 1 is a diagram illustrating an embodiment of a desired transmission signal. In the example shown, the band 2 transmission signal of an ultra wideband (UWB) system is shown. Desired transmission signal 100 has a bandwidth of 508 MHz. For example, desired transmission signal 100 may be generated by a WiMedia wireless system where bands have a width of 508 MHz. In some embodiments, some other UWB system is used (e.g., other than WiMedia) and/or a transmission signal has some other bandwidth (e.g., other than 508 MHz). The carrier frequency (i.e., center frequency of the band) of desired transmission signal 100 is 3.96 GHz.

In this example, desired transmission signal 100 includes notch 102 that is 20 MHz wide and is centered at 3.96 GHz. A notch is a portion of a transmission signal that is attenuated or suppressed and in some cases is not used to exchange information. For example, a wireless system may have detected another wireless system within the frequency range of notch 102 and may have created notch 102 to avoid interfering with the other wireless system. Any appropriate technique may be used to create a notch in a transmission signal. In some embodiments, a notch is created in the digital domain by inserting zeros into appropriate frequency bins of an Inverse Fast Fourier Transform (IFFT). For example, some wireless transmitters have an IFFT that converts data from the frequency domain to the time domain. Some wireless systems that implement or conform to the WiMedia UWB specification may include at 128 point IFFT. Each bin corresponds to a particular frequency and zeros (or some other appropriate value) is inserted into those bins that correspond to a notch.

In some embodiments, a regulatory agency requires a certain degree of attenuation or suppression for a notch (e.g., so that a wireless system associated with desired transmission signal 100 does not interfere with the other wireless system operating in the frequency range of notch 102). For example, some regulatory agencies in Japan and/or Europe are concerned with the potential interference caused by UWB systems on some narrowband systems (e.g., WiMax) since UWB systems have such a large bandwidth (e.g., 508 MHz). In some cases the proposed maximum UWB signal level within the notch is −70 dBm/MHz.

Although transmission signal 100 may be desired, some other transmission signal may result or be generated by a wireless system, for example as a result of local oscillator leakage. The following figures illustrate two examples.

Figure 2A:
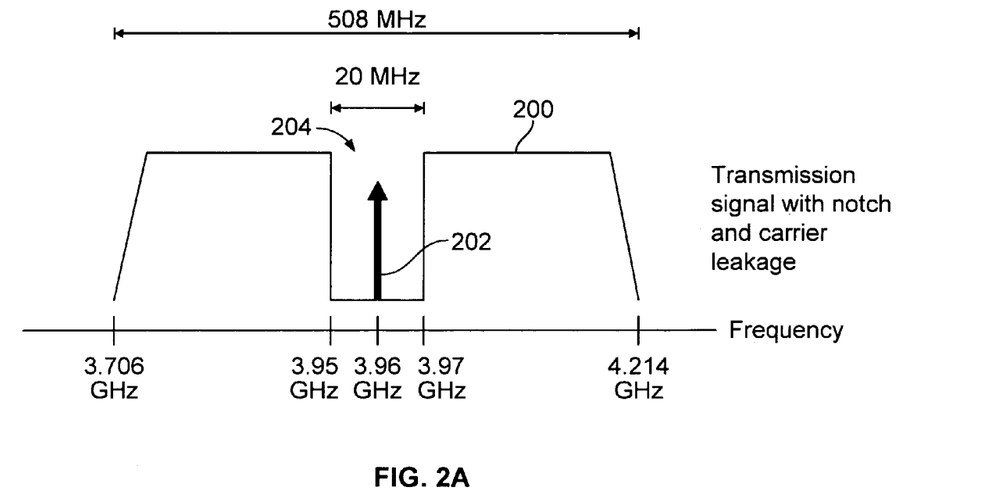
FIG. 2A is a diagram illustrating an embodiment of a transmission signal that includes local oscillator leakage in a notch.

FIG. 2A is a diagram illustrating an embodiment of a transmission signal that includes local oscillator leakage in a notch. In the example shown, it is required or desirable for a wireless system to transmit desired transmission signal 100 but transmission signal 200 may be what is actually generated. As in the example of FIG. 1, transmission signal 200 has a bandwidth of 508 MHz and notch 204 has a bandwidth of 20 MHz. However, notch 204 includes local oscillator leakage 202. The frequency of local oscillator leakage 202 occurs at the carrier frequency generated by a local oscillator (e.g., the center frequency of a band, which in this example is 3.96 GHz). In some embodiments, a carrier frequency is at some other frequency besides 3.96 GHz (e.g., because some other band is being used or a band has some other center frequency) and local oscillator leakage 202 occurs at that frequency. Local oscillator leakage 202 may occur as a result of DC components (e.g., at the input of a quadrature modulator) and/or a leakage path from a local oscillator to an output.

As a result of local oscillator leakage 202, the signal level or degree of suppression of notch 204 may surpass a desired or required signal level associated with notch 204. For example, local oscillator leakage 202 may be greater than a degree of attenuation set by some regulatory agency. In some cases, wireless systems that are unable to satisfy a regulatory agency's requirements are not permitted to be sold and/or used in a country or region.

Figure 2B:
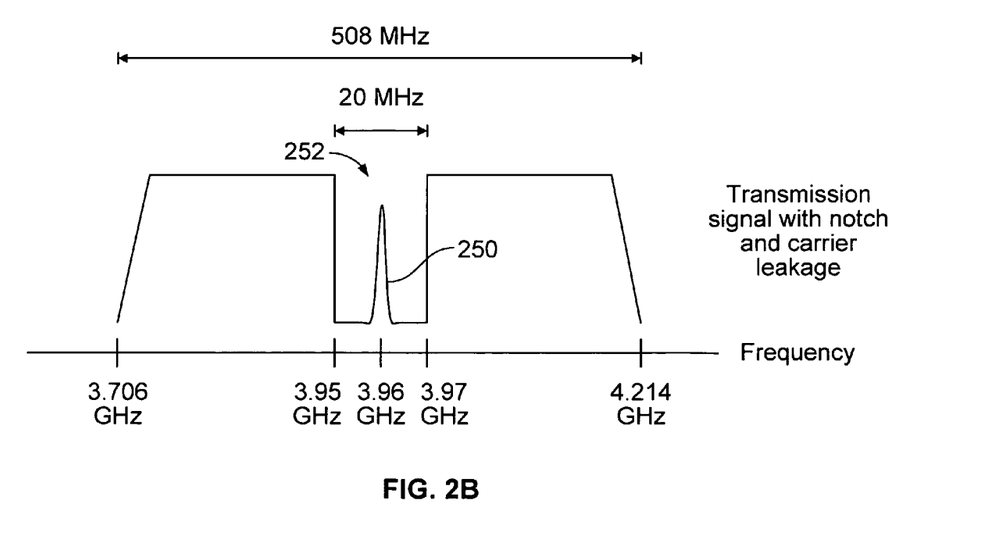
FIG. 2B illustrates a second embodiment of a transmission signal with local oscillator leakage.

FIG. 2B illustrates a second embodiment of a transmission signal with local oscillator leakage. The example of FIG. 2B is similar to that shown in FIG. 2A, except that local oscillator leakage 250 is not an impulse function and has some bandwidth associated with it. In some cases, local oscillator leakage may resemble the example of FIG. 2B more than that of FIG. 2A. For example, if a wireless system is operating in a band hopping mode where a logical channel includes multiple bands (i.e., hop bands), local oscillator leakage may resemble the example of FIG. 2B more than the example of FIG. 2A. In some cases, local oscillator leakage 250 contributes to the floor or otherwise raises the signal level of notch 252.

The relative frequencies and/or signal levels shown in these figures and/or in other figures are meant to be illustrative. In some cases, local oscillator leakage has a different signal levels, shape, and/or width than the examples shown herein. For example, in some cases local oscillator leakage may have a signal level greater than an associated transmission signal. In some cases, a notch may include or overlap with a carrier frequency but the carrier frequency may not necessarily occur at the center of the notch (i.e., a carrier frequency may be off-center with respect to a notch).

In the case of UWB, the transmission signal level outside notch 252 may be as high as −41.3 dBm MHz. The UWB total transmit power is therefore as high as −9.5 dBm when hopping in a 3 band pattern (i.e., −41.3 dBm/MHz+10* $\log_{10}$ (508)+10* $\log_{10}$(3)). To meet a −70 dBm requirement, the signal to LO leakage ratio must be larger than 60.5 dB. This high signal to LO ratio is much higher than has been previously required of other wireless systems and is not feasible to archive using traditional design techniques. What is disclosed is a technique for relocating local oscillator leakage (e.g., so that the relocated local oscillator leakage is no longer within a notch and a regulatory agency's requirements can be satisfied). The following figure illustrates one embodiment in which local oscillator leakage is relocated.

Figure 3:
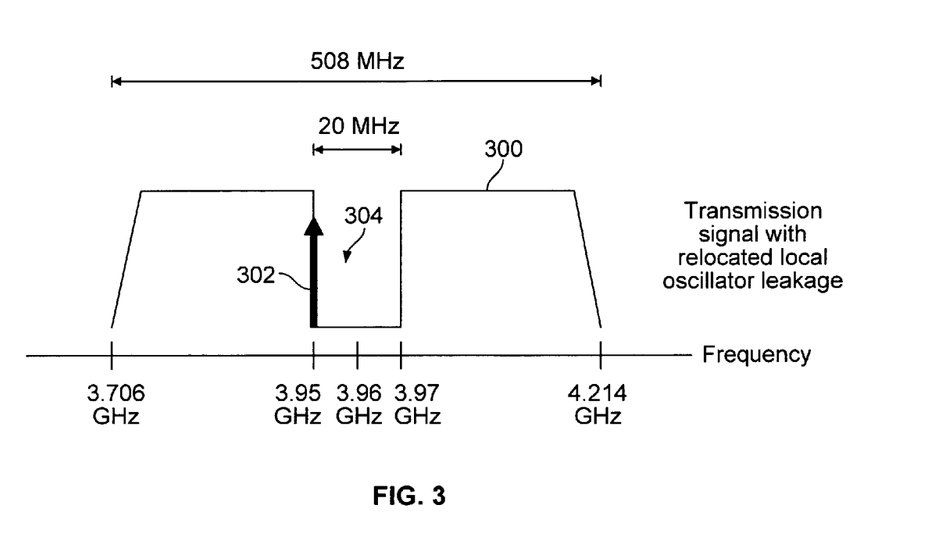
FIG. 3 is a diagram illustrating an embodiment of a transmission signal with relocated local oscillator leakage.

FIG. 3 is a diagram illustrating an embodiment of a transmission signal with relocated local oscillator leakage. In the example shown, transmission signal 300 has the same bandwidth (i.e., 508 MHz) and the same carrier frequency (i.e., 3.96 GHz) as the examples shown in FIGS. 2A and 2B. However, local oscillator leakage 302 has been relocated and is located at 3.95 GHz instead of 3.96 GHz. That is, the local oscillator leakage has been shifted and is no longer located within notch 304 and does not contribute to the signal level of notch 304. In this example, local oscillator leakage 302 is shown with the same vertical placement with respect to transmission signal 300 as in FIG. 2A for illustrative purposes. In some cases, relocated local oscillator leakage contributes to the signal level of a transmission signal, causing a rise in the signal level at appropriate frequencies (e.g., 3.95 GHz).

In various embodiments, local oscillator leakage is relocated or shifted by various amounts. In this example, relocated local oscillator leakage 302 is located at the edge of notch 304. In some embodiment, relocation includes some margin in the frequency domain (e.g., so that the relocated local oscillator leakage is not located at the edge of a notch). For example, if the shape of local oscillator leakage resembles the example of FIG. 2B more than FIG. 2A, it would be desirable to have some margin so that the signal level of the relocated local oscillator leakage drops off before the edge of a notch. In some cases, the exact shape or bandwidth of local oscillator leakage is difficult to measure and some margin is used.

In some embodiments, local oscillator leakage is relocated in the other direction (e.g., to higher frequencies on the right side of notch 304). In some embodiments, local oscillator leakage is relocated so that it is located outside of the frequency spectrum of a transmission signal (e.g., is relocated to a frequency less than 3.706 GHz or to a frequency greater than 4.214 GHz in this example).

Relocating local oscillator leakage may be attractive in some applications because it does not necessarily require the use of a specially configured receiver. For example, a receiver may not necessarily need to know that the transmitted signal includes local oscillator leakage that has been relocated in order for the receiver to be able to properly receive and/or decode the transmitted signal.

In some embodiments, local oscillator leakage relocation is combined with one or more techniques to achieve a desired or required degree of attenuation associated with a notch, improve performance, etc. For example, in some embodiments, local oscillator relocation is combined with a technique to (further) reduce or attenuate the signal level of a notch. In some embodiments, local oscillator leakage relocation is combined with a technique to suppress local oscillator leakage.

The techniques disclosed herein are used with various transmitters in various embodiments. For example, some wireless systems include direct conversion transmitters. A direct conversion transmitter is a type of transmitter that converts a data signal at a baseband frequency (i.e., centered at DC or a frequency of zero) directly to an "on-air" or transmission frequency without first converting the data signal to an intermediate frequency. In some embodiments, other types of transmitters (e.g., intermediate frequency transmitters, near-direct conversion transmitters that use a data signal that is near or substantially at DC, etc.) are used. Any appropriate transmitter may be used.

In some embodiments, local oscillator leakage relocation is used with a band hopping wireless system. In one example of band hopping, a logical channel includes bands 1, 2, and 3 and the wireless system rotates through those bands in a hop sequence or pattern that is repeated, (e.g., band 1, 3, and then 2). The bands that comprise a logical channel are sometimes referred to as hop bands. Any number of hop bands, any hop sequence, and/or any hop sequence length may be used. In some embodiments, band hopping is also referred to as Time Frequency Interleaving (TFI) and using a single band is referred to as Fixed Frequency Interleaving (FFI). In some embodiments, the techniques described herein are used with a band hopping system. For example, one or more hop bands of a logical channel may have a carrier frequency that overlaps with a notch in a transmission signal and the local oscillator leakage is relocated. In some embodiments, local oscillator leakage relocation is used with system that is operating in a Fixed Frequency Interleaving mode.

Although some examples described herein discuss wireless systems, in some embodiments, the techniques disclosed herein are used with wired systems. For example, a transmission signal that is sent over a cable or other wired medium may be processed so that local oscillator leakage is relocated.

In some embodiments, transmission signal 100 with relocated local oscillator leakage is obtained by frequency shifting a data signal by an appropriate amount and combining the shifted data signal with a local oscillator signal that is correspondingly shifted (e.g., to compensate for the shifting of the data signal). The following figures illustrate an example of frequency shifting a data signal.

Figure 4A:
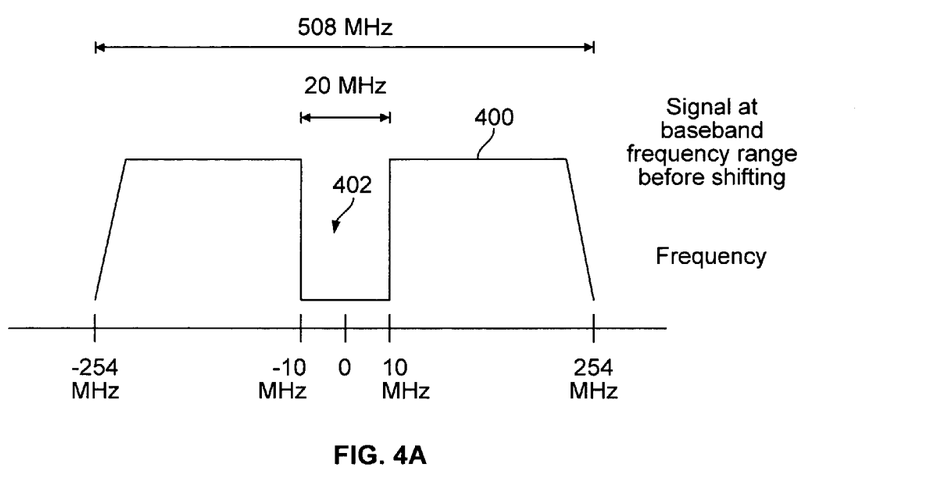
FIG. 4A is a diagram illustrating an embodiment of a data signal prior to being frequency shifted.

FIG. 4A is a diagram illustrating an embodiment of a data signal prior to being frequency shifted. In the example shown, data signal 400 is at a baseband frequency range (i.e., is centered at a frequency of 0) and has a bandwidth of 508 MHz. Notch 402 is 20 MHz wide and is centered at a frequency of 0. In this example, data signal 400 corresponds to a point in a transmit process or path prior to combination or mixing with a local oscillator that is operating at a carrier frequency.

Figure 4B:
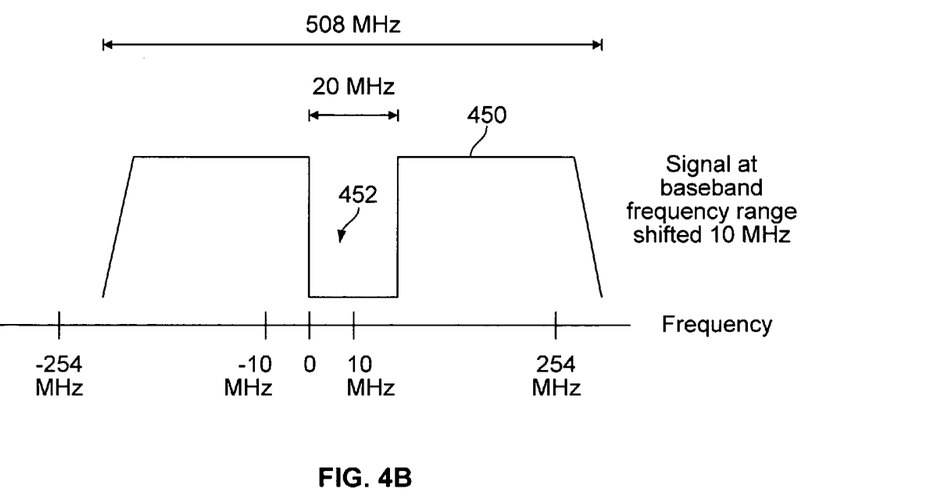
FIG. 4B is a diagram illustrating an embodiment of a data signal after being frequency shifted.

FIG. 4B is a diagram illustrating an embodiment of a data signal after being frequency shifted. In the example shown, data signal 400 of FIG. 4A is frequency shifted 10 MHz up in frequency (i.e., shifted to the right). Alternatively, in some embodiments, a data signal is down shifted in frequency. FIGS. 4A and 4B show the same x axis to illustrate the frequency shifting of the data signal; note that data signal 450 and notch 452 have the same widths and shape as data signal 400 and notch 402, respectively but are located 10 MHz higher. In this example, a frequency shifted data signal that will result in transmission signal 300 is shown and the data signal is shifted 10 MHz. In some embodiments, some other relocation is desired and the amount and/or direction that a data signal is shifted varies accordingly.

A local oscillator that is operating at a carrier frequency is adjusted by a corresponding amount (not shown). For example, a local oscillator operating at a carrier frequency of 3.96 GHz is adjusted to operate at 3.95 GHz (i.e., 3.96 GHz− 10 MHz) to match shifted data signal 450. The 3.95 GHz local oscillator signal is then combined with shifted data signal 450 to obtain transmission signal 300 shown in FIG. 3. Conversely, in embodiments where a data signal is down shifted, a local oscillator signal can be increased by an appropriate amount and combined with the frequency down shifted data signal. The local oscillator leakage in such embodiments may be shifted up in frequency so that it is located to the right of a notch.

Figure 5:
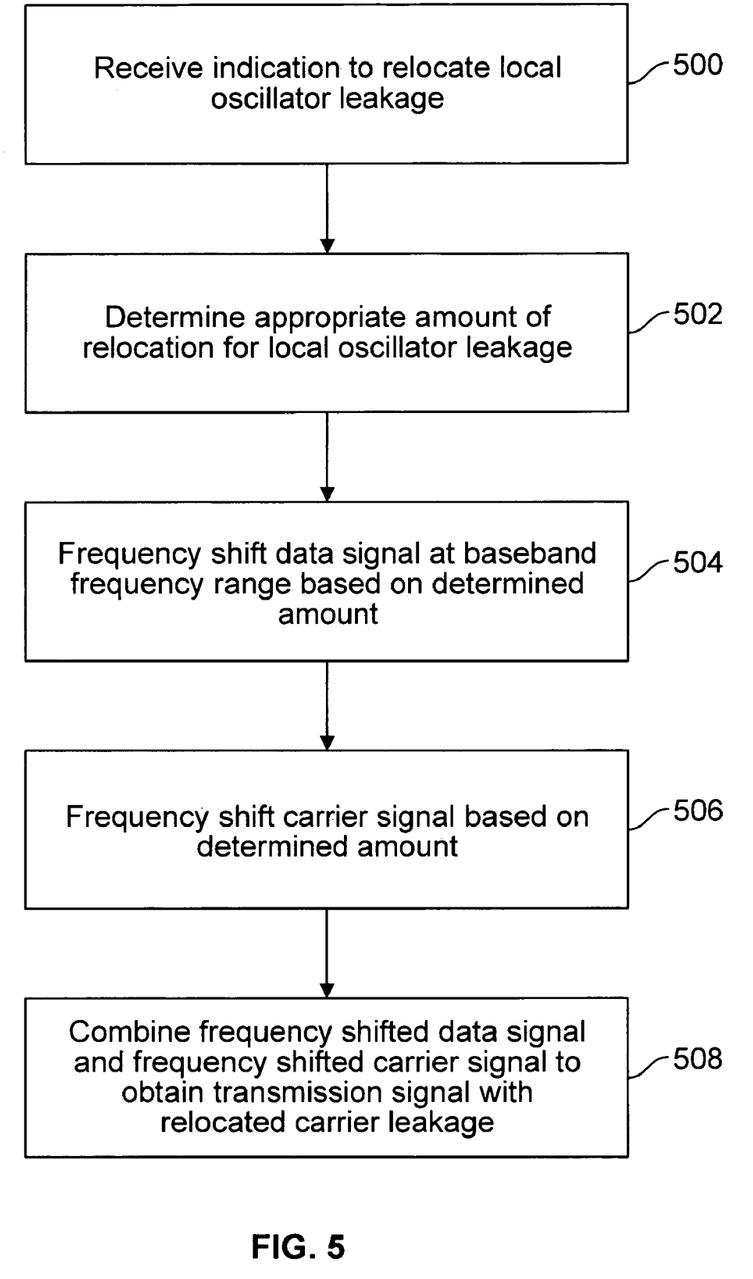
FIG. 5 is a flowchart illustrating an embodiment of a process for relocating local oscillator leakage.

FIG. 5 is a flowchart illustrating an embodiment of a process for relocating local oscillator leakage. In the example shown, a notch in a transmission signal includes or overlaps with a carrier frequency of a transmission signal and local oscillator leakage is relocated so that it not within the frequency range of the notch.

At 500, an indication is received to relocate local oscillator leakage. For example, some wireless systems have a detection and/or avoidance module that detects the presence of other wireless systems. In some embodiments, a signal is received from a detection and/or avoidance module when another wireless system, operating at a frequency spectrum that includes the carrier frequency of a transmitting wireless system, is detected.

An appropriate amount of relocation for the local oscillator leakage is determined at 502. For example, the frequency range of a notch or suppressed portion may be obtained (e.g., $f_{low}$ or $f_{high}$), the carrier frequency may be obtained (e.g., $f_{carrier}$), and appropriate numbers may be subtracted (e.g., $f_{carrier}-f_{low}$ or $f_{high}-f_{carrier}$). In some embodiments, the leakage is not an impulse function and the width of the leakage is accounted for. In some embodiments, some margin is included. In some embodiments, local oscillator leakage is shifted or relocated in predefined units. For example, in some cases, leakage is relocated in units of 4.125 MHz. In some embodiments, certain frequencies or signals used in relocating local oscillator leakage are already available from an existing component and those frequencies or signals are used so that additional components are not needed. In some embodiments, an amount determined includes a positive/negative sign or a direction (e.g., relocate local oscillator leakage down in frequency or up in frequency). In some embodiments, local oscillator leakage is shifted by a predefined or fixed amount.

At 504, a data signal at a baseband frequency range is frequency shifted based on the determined amount. In some embodiments, a data signal is frequency shifted based on the positive/negative sign and/or an amount determined at 502. For example, FIGS. 4A and 4B illustrate one example for frequency shifting a data signal. At 506, a carrier signal is frequency shifted based on the determined amount. In some embodiments, if a data signal is downshifted in frequency at 504 then a local oscillator adjusted at 506 is increased in frequency by the same amount.

At 508, a frequency shifted data signal and a frequency shifted carrier signal are combined to obtain a transmission signal with relocated carrier leakage. For example, in some embodiments a direct conversion transmitter is used. In some embodiments, some other type of transmitter is used. A transmission signal includes additional processing as appropriate before it is transmitted wirelessly, such as filtering, amplifying, etc. In some embodiments, downstream or subsequent processing is modified or adjusted as appropriate to accommodate processing associated with relocating local oscillator leakage. For example, some transmitters include one or more filters for filtering a data signal prior to being mixed with a carrier signal. In some embodiments, these filter(s) are adjusted to accommodate frequency shifting the data signal at 504 (e.g., to accommodate the wider baseband frequency). Other changes or modifications to a downstream or subsequent process may be made if needed.

In various embodiments, a data signal is frequency shifted at 504 using various techniques. The following figures illustrate two embodiments for frequency shifting a data signal. In some embodiments, data associated with subcarriers or frequency bins are frequency shifted, for example at the input of an Inverse Fast Fourier Transform (IFFT). In some embodiments, a data signal is frequency shifted using multipliers and adders.

Figure 6A:
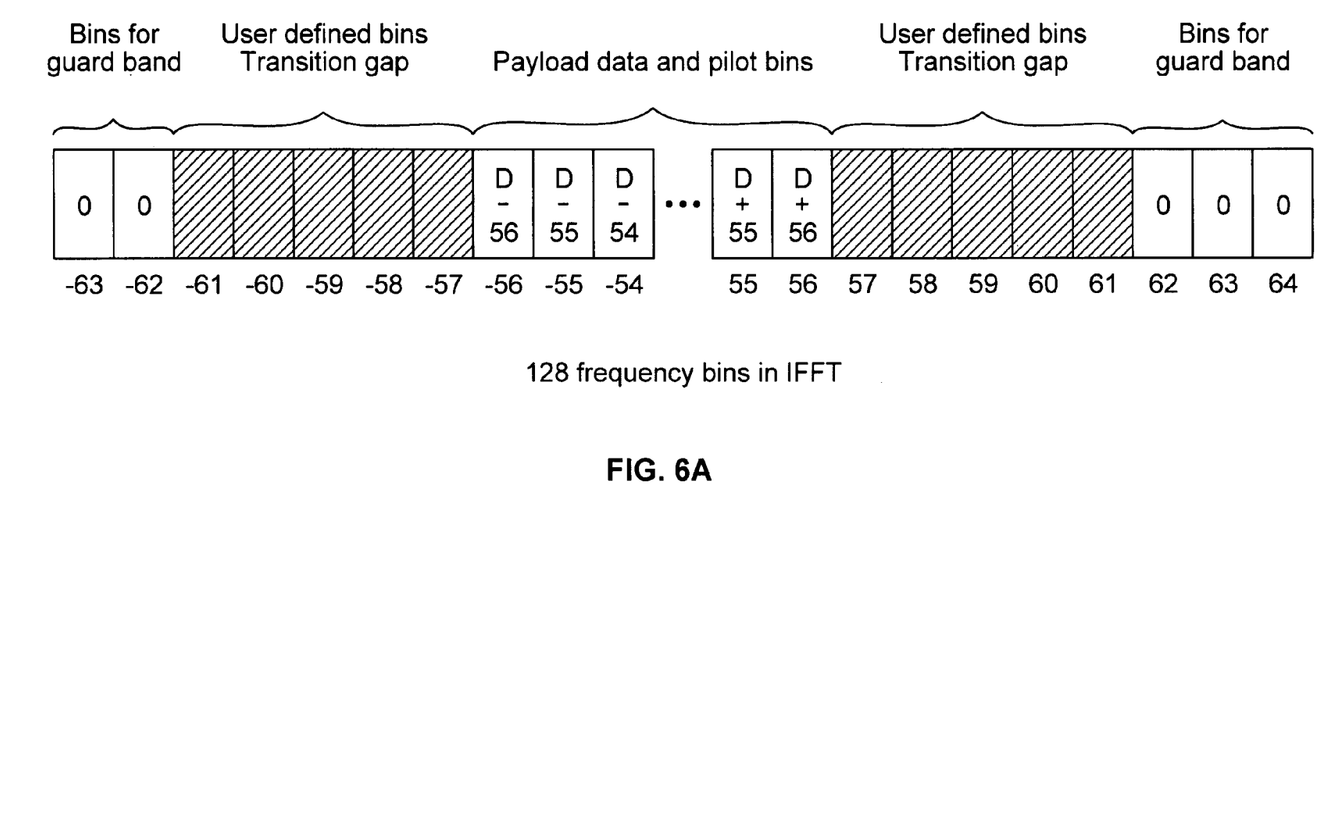
FIG. 6A is a diagram illustrating an embodiment of data in frequency bins of an IFFT prior to frequency shifting.

FIG. 6A is a diagram illustrating an embodiment of data in frequency bins of an IFFT prior to frequency shifting. In the example shown, an IFFT is shown with 128 frequency bins, numbered from −63 thru 64. An IFFT is a parallel processing device that takes in N equally spaced frequency bins and outputs the equivalent time domain signal. Frequency bins may also be referred to as subcarriers.

The IFFT processes a data signal at a baseband frequency range (i.e., centered at a frequency of 0). Subcarrier 0 corresponds to a frequency of 0, the negative subcarriers correspond to negative frequencies, and the positive subcarriers correspond to positive frequencies. The WiMedia UWB specification describes the functionality or usage associated with certain subcarriers. Subcarriers −63 thru −62 and 62 thru 64 are set to zero to create a guard band between bands. Subcarriers −61 thru −57 and 57 thru 61 are user defined bins and correspond to frequency ranges of −251.625 MHz thru −235.125 MHz and 235.125 MHz thru 251.625 MHz, respectively. In this example, these subcarriers are used as a transition gap. For example, a transmission signal may gradually decrease in signal strength over subcarriers −57 thru −61 and 57 thru 61. Appropriate values may be passed to these frequency bins of an IFFT, such as zeros.

Subcarriers −56 thru 56 (excluding subcarrier 0) correspond to frequencies of −231 MHz to 231 MHz and are used to carry payload data or are pilot bins. Data is passed to or is associated with an appropriate subcarrier. For example, data D −56 is associated with subcarrier −56, data −55 is associated with subcarrier −55, etc. In some embodiments, data is passed or mapped to some other subcarrier in order to frequency shift a data signal. The following figure illustrates one example.

Figure 6B:
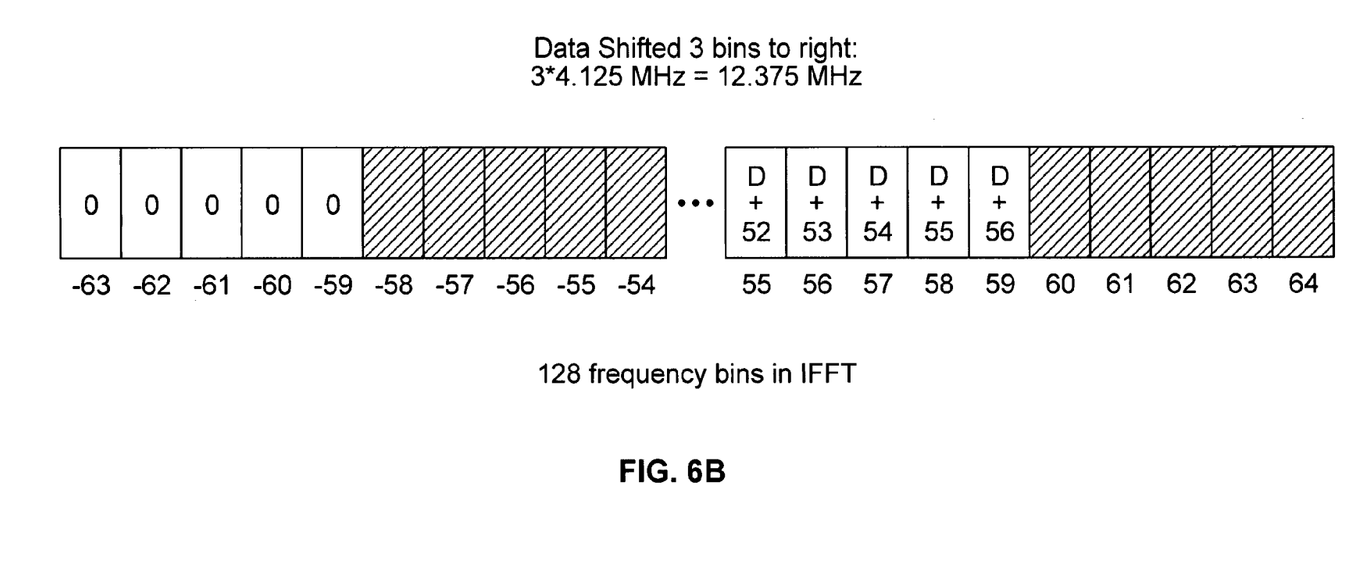
FIG. 6B is a diagram illustrating an embodiment of frequency shifting a data signal by changing a mapping of data to subcarriers in an IFFT.

FIG. 6B is a diagram illustrating an embodiment of frequency shifting a data signal by changing a mapping of data to subcarriers in an IFFT. In this example, each piece of data (beginning from the state shown in FIG. 6A) is shifted three bins to the right (i.e., up in frequency). For example, data D −56 is passed to subcarrier −53, data D −55 is passed to subcarrier −52, etc. In this example, a zero value is passed to subcarriers −63 thru −61 which are exposed by the frequency shift. In some embodiments, some other value besides zero is passed to the subcarriers that are exposed by a frequency shift.

In this example, the WiMedia UWB specification used and the IFFT is associated with a bandwidth of 528 MHz. Since there are 128 subcarriers, each subcarrier is separated by 4.125 MHz (i.e., 528 MHz/128). Using this technique, a data signal is shifted in units of 4.125 MHz. Therefore, if it is desired to relocate a local oscillator signal by at least (for example) 10 MHz, a shift of three or more subcarriers is needed. Shifting data by three subcarriers in this example corresponds to a frequency shift of 12.375 MHz, which is greater than the desired or required relocation of 10 MHz. In some embodiments, some other IFFT is used (e.g., 64 point IFFT, 256 point IFFT, etc.) and/or an IFFT is associated with some other value besides 528 MHz and calculations are modified accordingly. In some embodiments, data is assigned or mapped to lower subcarriers (i.e., shifted to the left or down in frequency) or is shifted by some other number of subcarriers besides three.

In some embodiments, data is mapped to subcarriers in such a manner that some data is lost. For example, if data is shifted up in frequency by nine subcarriers, data D +56 is lost, data D +55 is passed to subcarrier 64, data D +54 is passed to subcarrier 63, etc. In some applications, it is acceptable to lose some data because a wireless system includes encoding or correction techniques that permit an acceptable level of performance even if some data is lost. Example encoding or correction techniques include repeating a symbol (e.g., an OFDM symbol), error correction coding, etc. In some embodiments, these encoding or correction techniques are described in a specification or standard, such as the WiMedia UWB specification.

Embodiments in which a data signal is frequency shifted by changing a mapping of data that is passed to an IFFT may be attractive for a variety of reasons. In some embodiments, such embodiments can be implemented without a great deal of design complexity, cost, etc. For example, a relatively small and/or simple piece of digital logic may be coupled to the input of an IFFT. This piece of logic may be able to change the mapping of data to subcarriers. For example, when operating in a normal mode where local oscillator leakage is not relocated, the mapping shown in FIG. 6A is used; when operating in a leakage relocation mode, the mapping shown in FIG. 6B is used.

Figure 7:
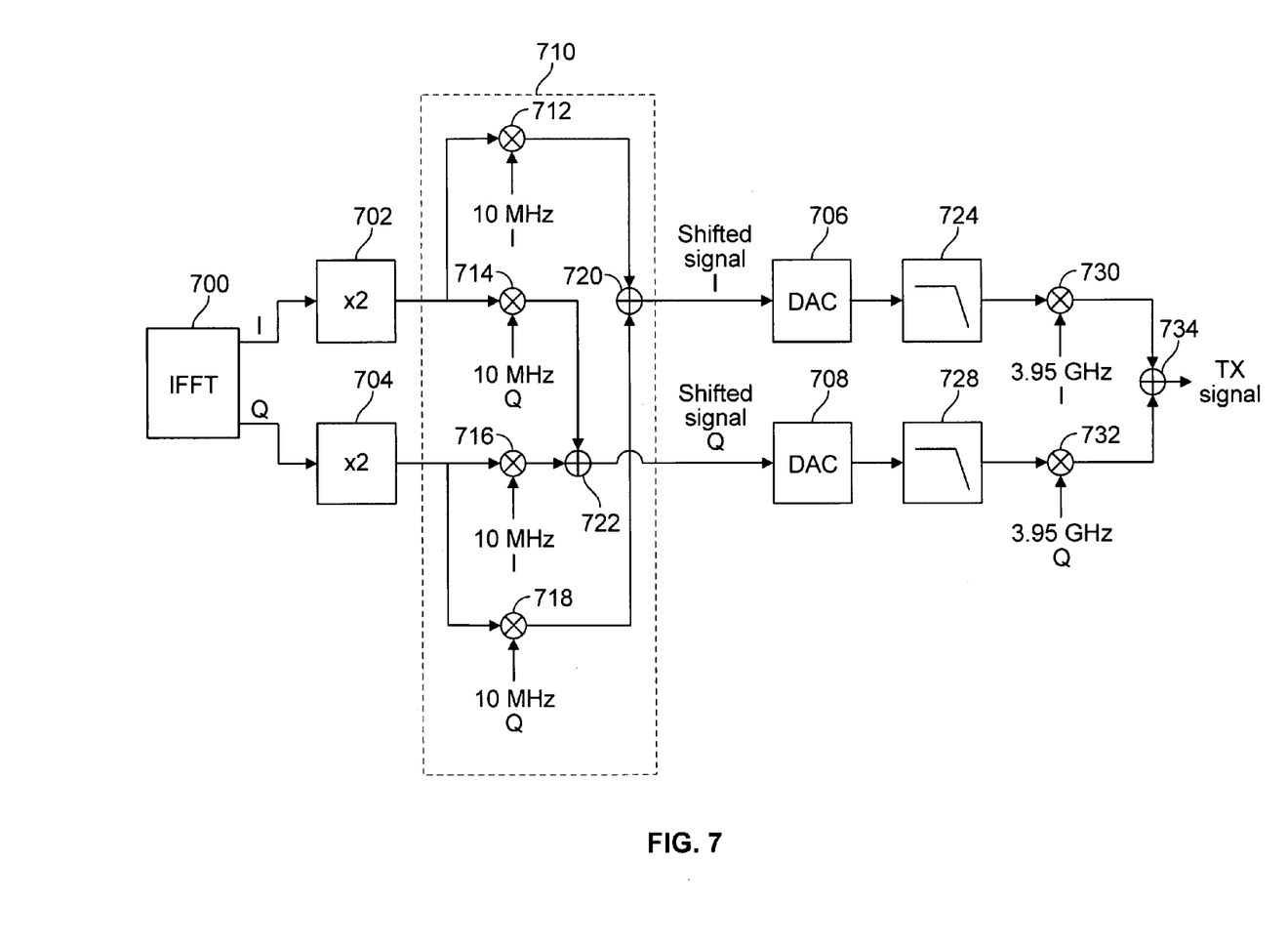
FIG. 7 is a diagram illustrating an embodiment of a transmitter that includes multipliers and adders for relocating local oscillator leakage.

FIG. 7 is a diagram illustrating an embodiment of a transmitter that includes multipliers and adders for relocating local oscillator leakage. In the example shown, the center frequency of a band is at 3.96 GHz, and it is desired to relocate local oscillator leakage by 10 MHz (e.g., because a notch is 20 MHz wide and the leakage would be located at the center of the notch if not relocated). In some embodiments, a transmitter may include other components in addition to or as an alternative to the example components shown herein.

IFFT 700 outputs two time domain signals, I and Q, that are passed to up-samplers 702 and 704, respectively. In this example, Digital to Analog Converters (DACs) 706 and 708 operate at two times the sample rate that IFFT 700 does and the up-samplers are used to accommodate this.

The up-sampled I and Q signals are passed to frequency shifter 710. In this example, frequency shifter 710 receives a data signal (e.g., centered at zero frequency) and outputs a frequency shifted data signal. Frequency shifter 710 includes multipliers 712, 714, 716, and 718. Each multiplier is passed a 10 MHz I or Q signal, for example that are 90 degrees out of phase with respect to each other. Multipliers 712 and 718 output real values that are summed by adder 720. Correspondingly, multipliers 714 and 716 output imaginary values and are summed by adder 722. If some other amount of relocation is desired, a different frequency may be passed to multipliers 712, 714, 716, and 718. Similarly, if local oscillator leakage relocation in the other direction is desired, the 10 MHz I and Q signals that are passed to the multipliers may be swapped.

The shifted I and Q signals are then passed to DACs 706 and 708. The analog I and Q signals are then filtered by filters 724 and 728. In some embodiments, filters 724 and 728 are adjusted as appropriate to accommodate the wider bandwidth caused by frequency shifting. The filtered signals are then mixed with 3.95 GHz I and Q signals using mixers 730 and 732 and are combined using adder 734.

In the example shown, specific frequencies are shown to more clearly illustrate the example. In some embodiments, configurable components are used so that local oscillator leakage can be relocated to one of multiple relocation frequencies. For example, in some embodiments, a configurable local oscillator or other frequency generator is coupled to multipliers 712, 714, 716, and 718. Any appropriate signal generator may be used.

In some applications, using multipliers to frequency shift a data signal is desirable. For example, the permitted frequency shifts may be unlimited or may have much finer granularity compared to the previous embodiment where local oscillator leakage is relocated in multiples of 4.125 MHz or some other increment depending upon, for example, the IFFT used (e.g., 128 point IFFT) and/or a bandwidth associated with the IFFT (e.g., 528 MHz). Another reason to use the multiplier method is that it would simplify the data flow control at the penalty of increased number of gates and current consumption.

The following equations describe relocation of local oscillator leakage mathematically. An RF signal (i.e., a transmission signal) at the antenna may be defined as:

RF=I* $\cos(w_0*t)$+Q* $\sin(w_0*t)$+L* $\cos(w_0*t+p)$, where $w_0$ is the center frequency of a band and L and p represent the level and phase of the LO leakage.

This can be rewritten as:

RF=real[(I+j*Q+k)*exp(j*$w_0$*t)], where I+j*Q is called the complex baseband signal and k is a complex number (e.g., a constant) that models carrier leakage.

To avoid interfering with another wireless system that is operating in a frequency band that includes $w_0$, (i.e., a notch includes the carrier frequency $w_0$), this is changed so it is outside this range. A new frequency, $w_1$, is defined:

$w_1$=$w_0$+dw, where dw is a frequency change or amount of relocation.

From the above equation:

$$\exp(w_1*t)=\exp(w_0*t)*\exp(dw*t)$$

To keep the RF signal at the same frequency, the new I' and Q' signals are (obtained by setting k to zero to simplify the equation):

$$RF = \text{real}[(I + j*Q) * \exp(j * w_0 * t)]$$
$$= \text{real}[(I' + j*Q') * \exp(j * w_1 * t)]$$
$$= \text{real}[(I' + j*Q') * \exp(j * w_0 * t) * \exp(j * dw * t)]$$

And thus in some embodiments the new complex baseband signal is:

$$I'+j*Q'=(I+j*Q)\exp(-j*dw*t)$$

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of relocating leakage, comprising:
   receiving, at a processor, an indication to relocate leakage in a transmission signal to be transmitted;
   obtaining, at the processor, a frequency change associated with relocating the leakage in the transmission signal; and
   using the processor to relocate the leakage in the transmission signal based at least in part on the frequency change, including by:
      frequency shifting a data signal based at least in part on the frequency change;
      frequency shifting a carrier signal based at least in part on the frequency change; and
      combining the frequency shifted data signal and the frequency shifted carrier signal.

2. A method as recited in claim 1, wherein the transmission signal includes a wirelessly transmitted signal.

3. A method as recited in claim 1, wherein the transmission signal further includes a suppressed portion that would overlap in frequency with the leakage if the leakage were not relocated.

4. A method as recited in claim 3, wherein the frequency range of the suppressed portion is being used by another wireless system.

5. A method as recited in claim 3, wherein obtaining includes determining the frequency change based at least in part on (1) the frequency range of the suppressed portion and (2) the frequency range of the leakage if the leakage were not relocated.

6. A method as recited in claim 5, wherein determining the frequency change is further based at least in part on (3) one or more permitted frequency changes.

7. A method as recited in claim 1, wherein obtaining includes obtaining a predefined frequency change.

8. A method as recited in claim 1, wherein the transmission signal is associated with ultra wideband (UWB).

9. A method as recited in claim 1, wherein the transmission signal is associated with a WiMedia ultra wideband (UWB) specification.

10. A method as recited in claim 1, wherein the transmission signal is associated with band hopping.

11. A method as recited in claim 1, wherein the frequency change includes a positive/negative sign.

12. A method as recited in claim 1, wherein in the event the data signal is up shifted in frequency by the frequency change, the carrier signal is down shifted in frequency by the frequency change.

13. A method as recited in claim 1, wherein frequency shifting the data signal includes using at least one multiplier.

14. A method as recited in claim 1, wherein frequency shifting the data signal includes changing a mapping of data to one or more subcarriers associated with an Inverse Fast Fourier Transform (IFFT).

15. A method as recited in claim 1, wherein relocating further includes adjusting, if needed, a filter associated with filtering the frequency shifted data signal prior to combination of the frequency shifted data signal and the frequency shifted carrier signal.

16. A system for relocating leakage, comprising:
   an interface configured to receive an indication to relocate leakage in a transmission signal to be transmitted; and
   a signal processor configured to:
      obtain a frequency change associated with relocating the leakage in the transmission signal; and
      relocate the leakage in the transmission signal based at least in part on the frequency change, including by:
         frequency shifting a data signal based at least in part on the frequency change;
         frequency shifting a carrier signal based at least in part on the frequency change; and
         combining the frequency shifted data signal and the frequency shifted carrier signal.

17. A system as recited in claim 16, wherein the transmission signal further includes a suppressed portion that would overlap in frequency with the leakage if the leakage were not relocated.

18. A system as recited in claim 17, wherein the signal processor is configured to obtain by determining the frequency change based at least in part on (1) the frequency range of the suppressed portion and (2) the frequency range of the leakage if the leakage were not relocated.

19. A system as recited in claim 18, wherein the signal processor is configured to determine the frequency change further based at least in part on (3) one or more permitted frequency changes.

20. A system as recited in claim 16, wherein the signal processor is configured to frequency shift the data signal by using at least one multiplier.

21. A system as recited in claim 16, wherein the signal processor is configured to frequency shift the data signal by changing a mapping of data to one or more subcarriers associated with an Inverse Fast Fourier Transform (IFFT).

22. A computer program product for relocating leakage, the computer program product being embodied in a computer readable medium and comprising computer instructions for:
  receiving an indication to relocate leakage in a transmission signal to be transmitted;
  obtaining a frequency change associated with relocating the leakage in the transmission signal; and
  relocating the leakage in the transmission signal based at least in part on the frequency change, including by:
    frequency shifting a data signal based at least in part on the frequency change;
    frequency shifting a carrier signal based at least in part on the frequency change; and
    combining the frequency shifted data signal and the frequency shifted carrier signal.

23. A computer program product as recited in claim 22, wherein the frequency change includes a positive/negative sign.

24. A computer program product as recited in claim 22, wherein in the event the data signal is up shifted in frequency by the frequency change, the carrier signal is down shifted in frequency by the frequency change.

* * * * *